(12) United States Patent
Komuro et al.

(10) Patent No.: US 8,465,019 B2
(45) Date of Patent: Jun. 18, 2013

(54) RECORDING APPARATUS

(75) Inventors: Shintaro Komuro, Shiojiri (JP);
Nobuhiko Shinozaki, Shiojiri (JP);
Tomoya Takikawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 12 days.

(21) Appl. No.: 12/490,552

(22) Filed: Jun. 24, 2009

(65) Prior Publication Data

US 2009/0322844 A1 Dec. 31, 2009

(30) Foreign Application Priority Data

Jun. 26, 2008 (JP) ................... 2008-167725

(51) Int. Cl.
*B41J 2/01* (2006.01)
*B65H 31/04* (2006.01)

(52) U.S. Cl.
USPC ................... 271/213; 347/104; 347/101

(58) Field of Classification Search
USPC .................. 271/213; 347/104, 101
See application file for complete search history.

(56) References Cited

U.S. PATENT DOCUMENTS

| 5,682,371 | A * | 10/1997 | Park .................. 720/613 |
| 5,715,229 | A * | 2/1998 | Kim et al. ............ 369/30.92 |
| 6,178,154 | B1 | 1/2001 | Inata et al. |
| 6,388,980 | B2 * | 5/2002 | Otani et al. ............. 720/603 |
| 6,921,217 | B2 | 7/2005 | Tsuji |
| 7,111,934 | B2 * | 9/2006 | Okuda et al. ............. 347/104 |
| 7,341,339 | B2 * | 3/2008 | Yoshikaie ................ 347/104 |
| 7,581,806 | B2 * | 9/2009 | Niioka ..................... 347/19 |
| 7,740,348 | B2 * | 6/2010 | Miyashita et al. ........ 347/101 |
| 8,152,295 | B2 * | 4/2012 | Komuro et al. .......... 347/104 |
| 8,202,014 | B2 * | 6/2012 | Komuro et al. .......... 400/525 |
| 2009/0295897 | A1 * | 12/2009 | Komuro et al. .......... 347/104 |

FOREIGN PATENT DOCUMENTS

| JP | 11-296866 | 10/1999 |
| JP | 2005-059584 | 3/2005 |

* cited by examiner

*Primary Examiner* — Luis A Gonzalez
(74) *Attorney, Agent, or Firm* — Workman Nydegger

(57) ABSTRACT

A recording apparatus includes a holding tray in which a second recording material can be set and a transportation driving roller that transports a first recording material and the holding tray. A front edge of the holding tray is set back from an outer edge of the second recording material set in the holding tray.

9 Claims, 18 Drawing Sheets

RECORDING APPARATUS

BACKGROUND

1. Technical Field

The present invention relates to recording apparatuses, such as printers, facsimiles, and copiers, including multi-function apparatuses, in which a recording material, such as an optical disc, is set in a set portion in a holding tray and recording is performed on the recording material in a recording execution area by moving the holding tray with a transporting mechanism.

2. Related Art

An ink jet printer as an example of a recording apparatus will be described below. Some ink jet printers can selectively perform recording on both soft recording materials that do not stand on their own, such as sheets and films, and hard recording materials that stand on their own, such as optical discs (CD-Rs, DVD-Rs, and the like). When recording is to be performed on a recording material such as a CD-R, a dedicated holding tray that is separately provided as an accessory is used, or, as disclosed in Japanese Unexamined Patent Application Publication No. 2005-59584, an ink jet printer having a holding tray accommodated in the main body of the printer is used. The holding tray has a setting recess in which a recording material, such as a CD-R, is set.

However, in a printer that performs recording using a known holding tray, the holding tray has a size sufficient to be transported such that the bottom surface thereof is placed on a transportation driving roller and a discharge driving roller located downstream of a recording head during recording or sensing operation. This increases the length of the holding tray in a recording-material conveying direction (depth), and thus, increases the size of the component. In addition, in a recording apparatus having a built-in holding tray, the depth of the main body of the recording apparatus increases. This makes it difficult to reduce the size of the main body of the recording apparatus.

SUMMARY

An advantage of some aspects of the invention is that it provides a recording apparatus that enables the use of a short holding tray to reduce the size of the main body of the recording apparatus.

According to a first aspect of the invention, a recording apparatus includes a holding tray in which a second recording material can be set and a transportation driving roller that transports a first recording material and the holding tray. A front edge of the holding tray is set back from an outer edge of the second recording material set in the holding tray.

According to this aspect, the front edge of the holding tray is set back from the outer edge of the recording material set in the holding tray, i.e., the front edge is cut shorter than the recording material. This can shorten the holding tray by a length equivalent to the setback portion and reduce the size of the component.

It is preferable that the holding tray have a length sufficient to be transported from a recording start position where recording on the second recording material is started to a recording termination position where recording on the second recording material is terminated by receiving transportation force from the transportation driving roller. Herein, the "recording start position" refers to the position of the holding tray when the recording head starts ejecting ink, and the "recording termination position" refers to the position of the holding tray when the ejection is terminated.

In this case, the holding tray has a length sufficient to be transported from the recording start position to the recording termination position by directly receiving the transportation force from the transportation driving roller without switching to another feeding mechanism. That is, when recording is performed on the recording material, the recording material has to be transported in the conveying direction over a distance equivalent to the length thereof. In this invention, because the length of the holding tray is equivalent to the entire length of the recording material, which is the minimum necessary length, the holding tray can be made smaller than a known holding tray. Furthermore, as described above, the transportation driving roller is not switched to another mechanism during transportation. Thus, it is possible to maintain the transportation accuracy while reducing the size.

It is preferable that the recording apparatus further include an orientation-maintaining portion that supports the holding tray in cooperation with the transportation driving roller to define an orientation of the holding tray during transportation from the recording start position to the recording termination position, and the orientation-maintaining portion support the holding tray at a position outside an area through which the first recording material passes.

In the case where the front edge of the holding tray is set back from the outer edge of the recording material and recording is performed on the recording material from the front end in the recording execution area, it is structurally impossible to perform recording while the front end of the holding tray is supported by a discharge driving roller to maintain the orientation. Thus, the orientation of the holding tray with respect to a recording head may become inappropriate.

However, in this case, the orientation of the holding tray during transportation from the recording start position to the recording termination position is maintained by the transportation driving roller and the orientation-maintaining portion. Therefore, even though the discharge driving roller cannot be used for structural reasons, recording can be performed while maintaining the orientation of the holding tray appropriately.

Since the provision of a platen rib (described below) mainly aims at defining the transportation orientation of a flexible recording material (first recording material), the platen rib is not necessarily appropriate from the standpoint of defining the orientation of the holding tray. However, the orientation-maintaining portion solely for supporting the holding tray maintains the orientation of the holding tray appropriately during transportation.

It is preferable that the recording apparatus further include a transportation driven roller that holds the holding tray between itself and the transportation driving roller, and the transportation driving roller and the transportation driven roller be arranged so as to apply urging force that urges a portion of the recording material positioned downstream of the transportation driving roller toward the orientation-maintaining portion.

Typically, the transportation driving roller and the transportation driven roller are arranged in what is called "downwardly guiding structure" in which urging force that urges a portion of the sheet positioned downstream of the transportation driving roller toward the orientation-maintaining portion is produced, in order to urge the sheet against the platen to maintain a certain distance between the sheet and the recording head and to prevent the leading end or trailing end of the sheet from floating up when recording is performed on the sheet. However, in this "downwardly guiding structure", the holding tray tends to be displaced from the original orientation particularly when the discharge driving roller cannot be used.

It can be said that the structure having the "orientation-maintaining portion" is particularly advantageous when used with the "downwardly guiding structure".

It is preferable that the holding tray be shorter than an entire traveling distance thereof and have an extendable moving mechanism that enables the holding tray to move over the entire traveling distance thereof.

In this case, the extendable moving mechanism enables the use of a short holding tray that is shorter than the entire traveling distance thereof. Thus, a structure in which the holding tray is accommodated in the main body of the recording apparatus can be realized without increasing the size of the main body of the recording apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

A recording apparatus of the invention will be described below. First, an outline of the overall structure of an ink jet printer 1 as a preferable embodiment of the recording apparatus of the invention will be described with reference to the drawings.

Figure 1:
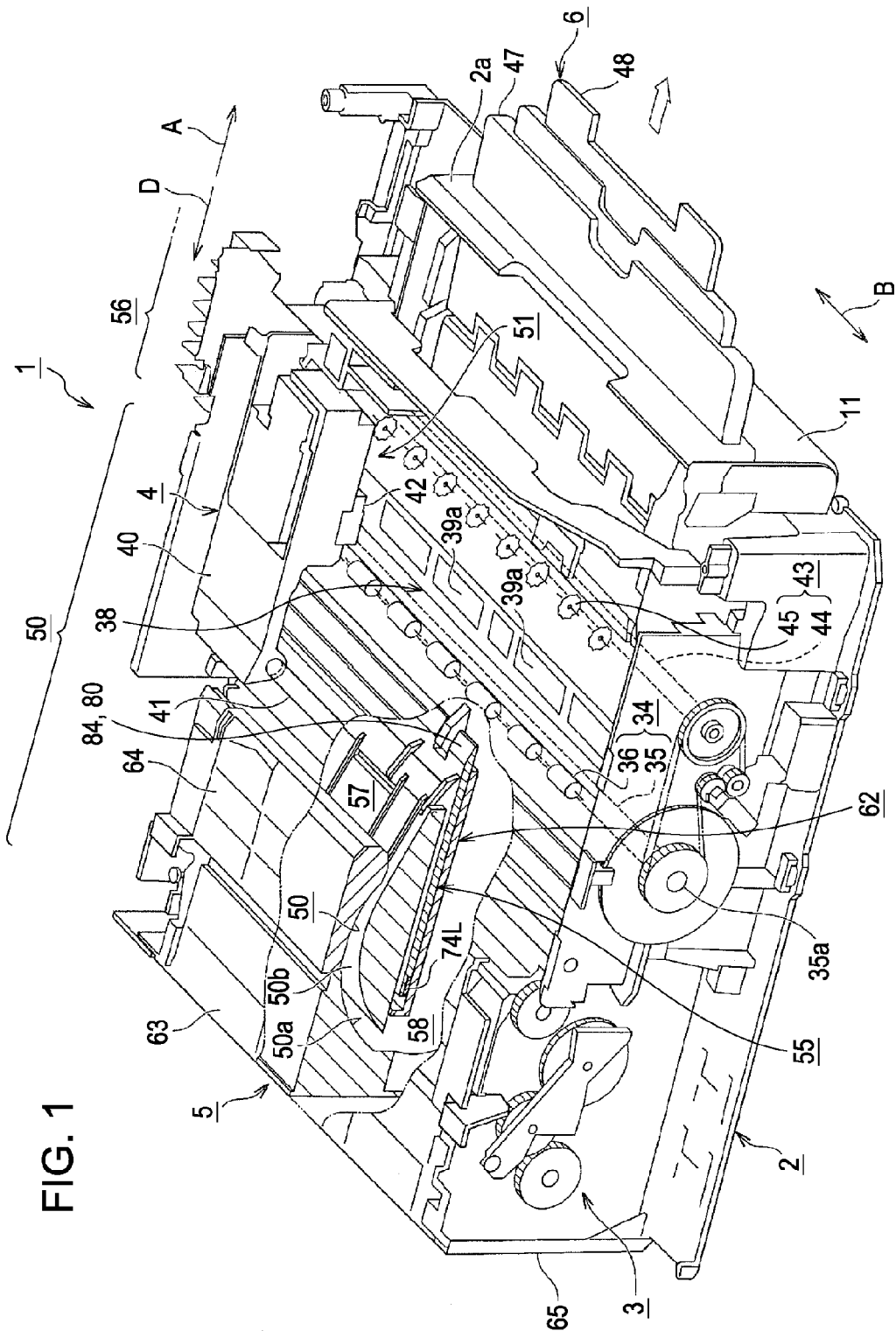
FIG. 1 is a perspective view showing the internal structure of an ink jet printer according to this embodiment.
Figure 2:
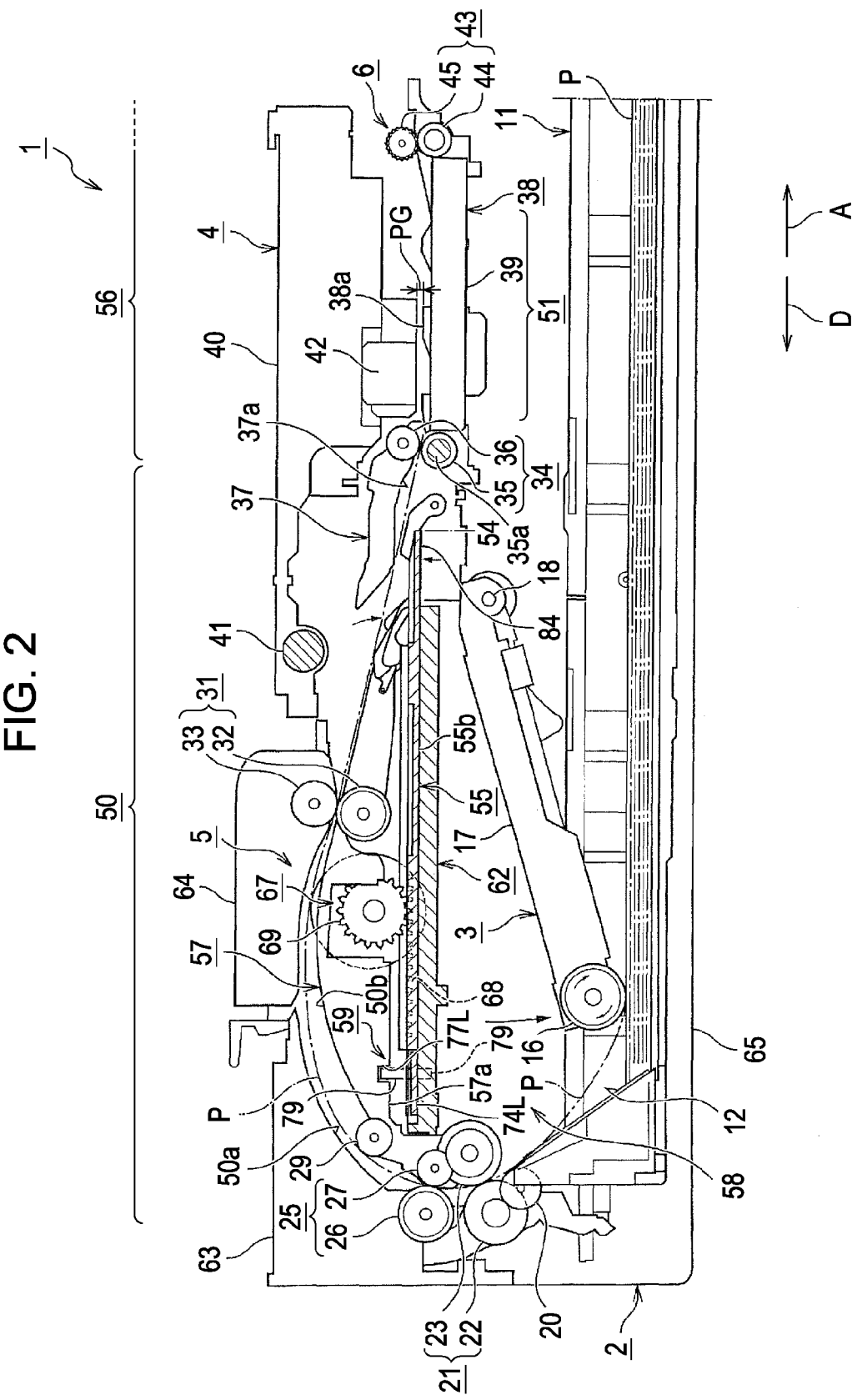
FIG. 2 is a side sectional view of the ink jet printer when a holding tray is stored.
Figure 3:
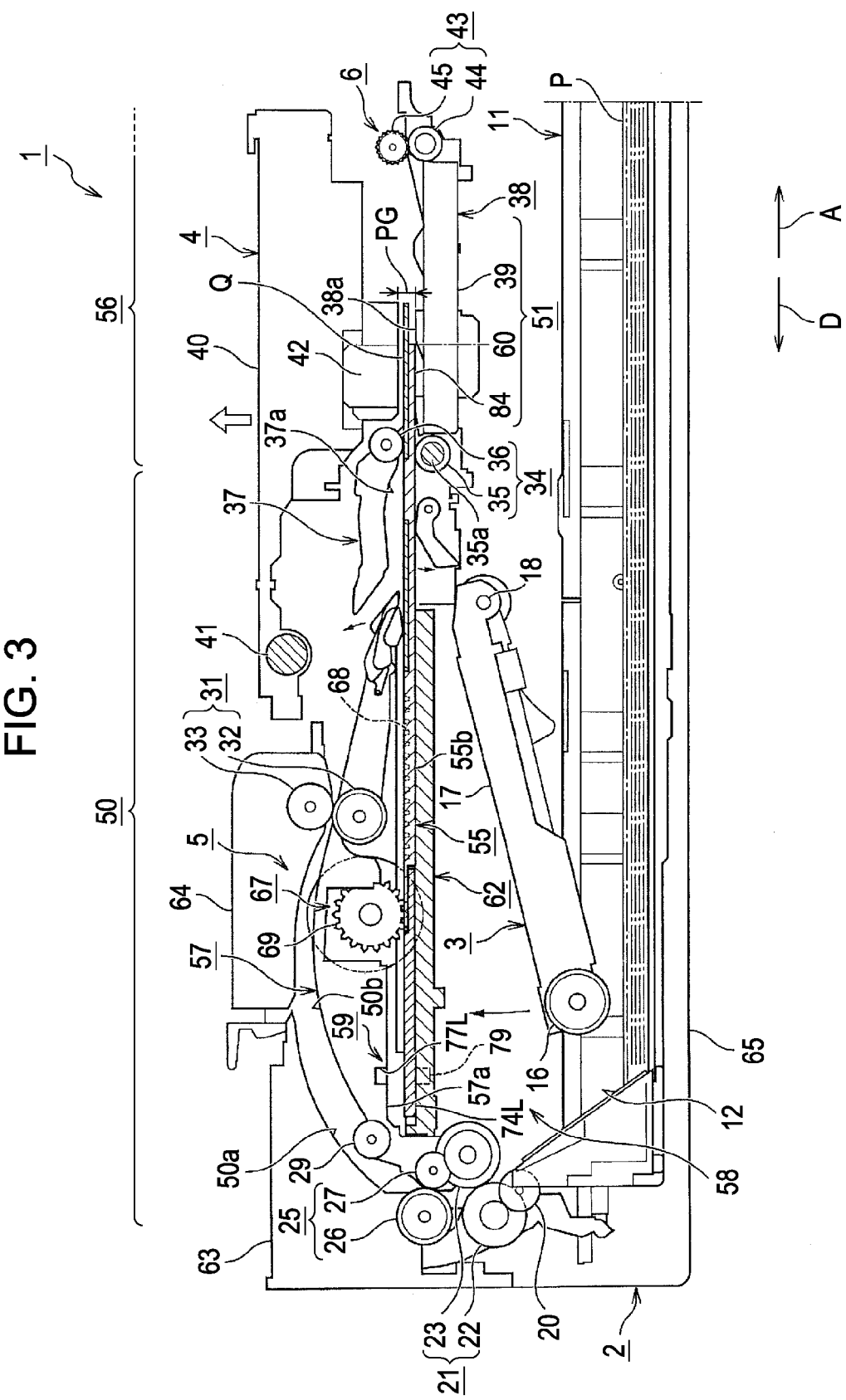
FIG. 3 is a side sectional view of the ink jet printer when recording is started.
Figure 4:
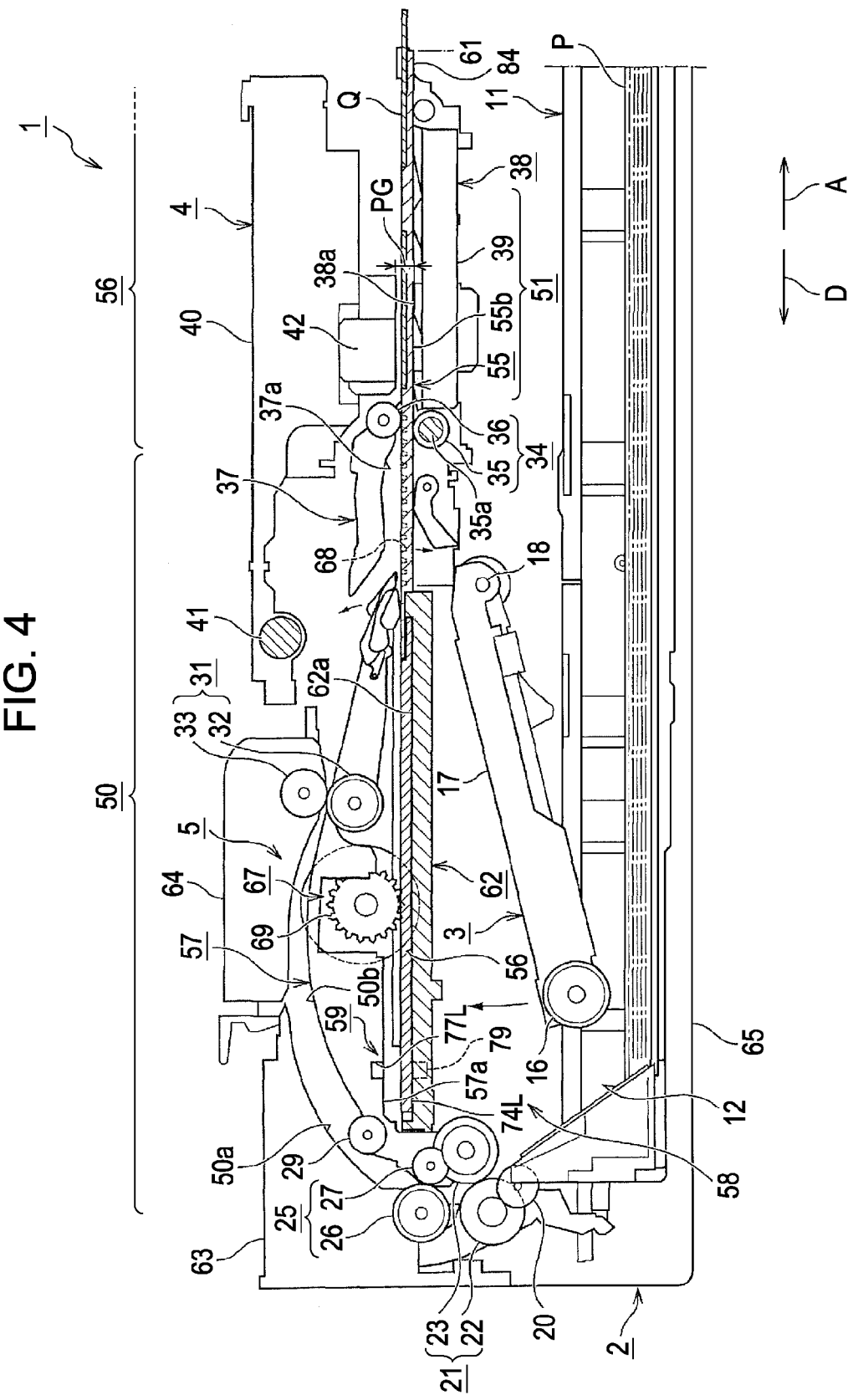
FIG. 4 is a side sectional view of the ink jet printer when the holding tray is located at a recording termination position.
Figure 5:
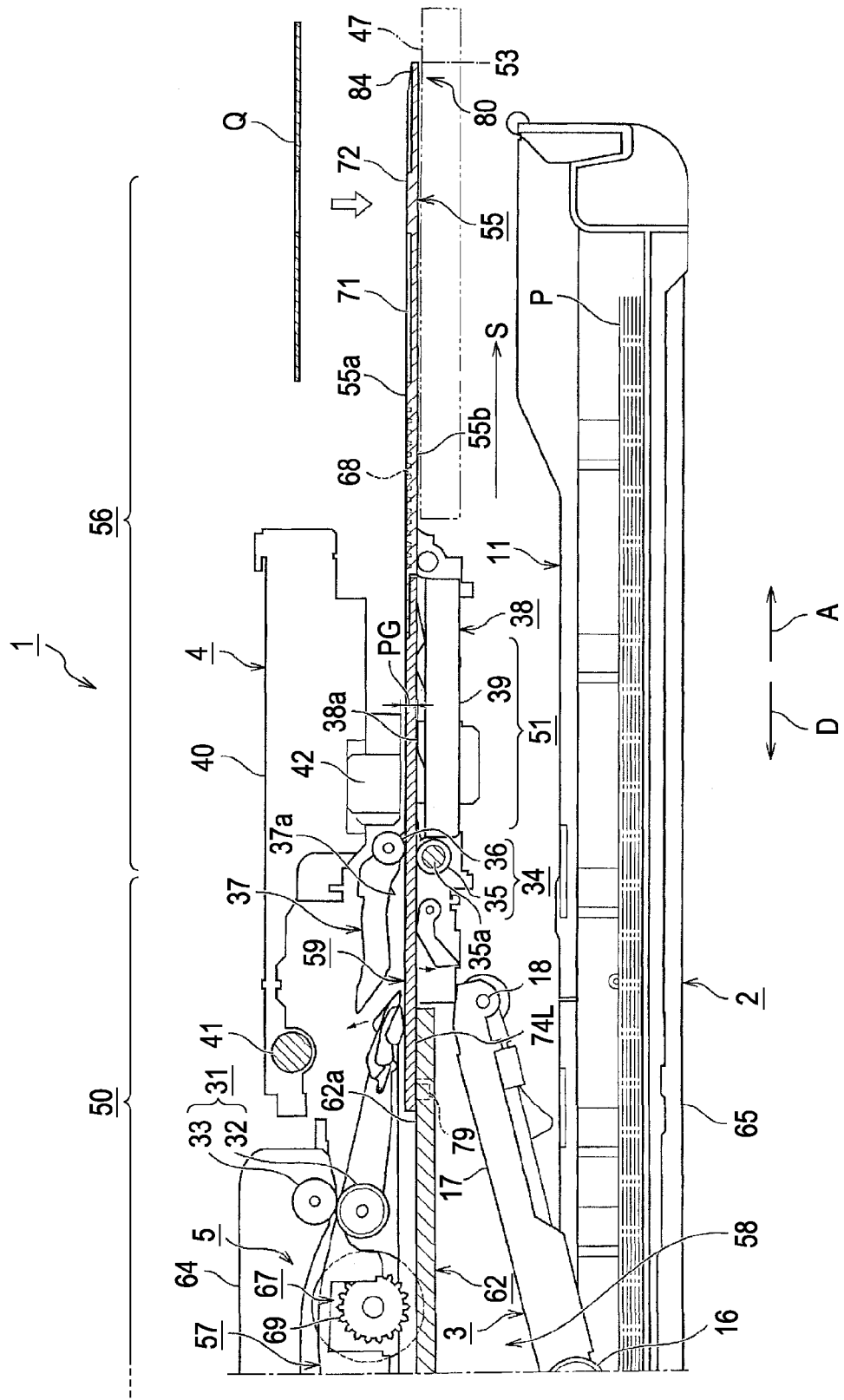
FIG. 5 is a side sectional view of the ink jet printer when a hard recording material is set.

FIG. 1 is a perspective view showing the internal structure of the ink jet printer, and FIG. 2 is a side sectional view schematically showing the internal structure of the ink jet printer when a holding tray is located at a stored position. FIG. 3 is a side sectional view of the ink jet printer when the holding tray is located at a recording start position, and FIG. 4 is a side sectional view of the ink jet printer when the holding tray is located at a recording termination position. FIG. 5 is a side sectional view of the ink jet printer when the holding tray is located at a set position.

The ink jet printer 1 illustrated in the drawings is a multi-function ink jet printer having an image-reading apparatus (scanner, not shown) mounted thereon. The ink jet printer 1 can perform recording on both soft recording materials (first recording material) P, such as sheets and films, and hard recording materials (second recording material) Q, such as optical discs including CD-Rs and DVD-Rs. In addition, the ink jet printer 1 is a serial printer having a recording head 42 on the bottom surface of a carriage 40 that can reciprocate in a width direction B perpendicular to a conveying direction A in the recording execution area of the above-mentioned two types of materials P and Q.

The ink jet printer 1 includes a rectangular-parallelepiped-shaped printer main body 2, serving as a main body of the recording apparatus, with an exterior consisting of relatively flat surfaces. The printer main body 2 has a feeding cassette 11 that can store multiple soft recording materials P such as normal sheets in a stacked state and that is removably fitted to a lower central portion of a front surface 2a. A discharging stacker 47, on which the soft recording materials P after recording are stacked, is provided above the surface to which the feeding cassette 11 is fitted. In addition, the front surface 2a of the printer main body 2 has operation buttons (not shown) for executing various operation instructions, a cartridge holder (not shown) for accommodating ink cartridges, etc.

The feeding cassette 11 is provided at a start position of a transportation path of the soft recording materials P. The soft recording materials P stored in the feeding cassette 11 are fed on a piece-by-piece basis from the top by an auto feeder 3 to a U-shaped reversing path 50 described below. The auto feeder 3 includes a pick-up roller 16 that draws upper soft recording materials P in the feeding cassette 11 backwards, a separating slope 12 that preliminarily separates the upper soft recording materials P and guides them to the U-shaped reversing path 50, a first guide roller 20 provided so as to be freely rotatable at a position diagonally behind and above the separating slope 12, and separating rollers 21 provided at a position diagonally behind and above the first guide roller 20.

The pick-up roller 16 is provided at an end of a swing arm 17 that swings about a swing shaft 18. The pick-up roller 16 is pressed against the top surface of the soft recording material P and is rotated in the conveying direction A during feeding. Thus, the upper soft recording materials P in the feeding cassette 11 can be drawn backwards. The separating rollers 21 include a pair of nip rollers, namely, a separating driven roller 22 provided with a torque limiter and a separating driving roller 23. The separating rollers 21 perform main separation to completely separate the uppermost soft recording material P from the subsequent soft recording materials P that cannot be separated in the preliminary separation by the separating slope 12.

The soft recording material P fed by the auto feeder 3 is transported in the U-shaped reversing path 50 to a recording position 51. Below the recording position 51 is provided a platen 38 that supports the bottom surface of the transported soft recording material P or the holding tray (holding the hard recording material Q) and that defines a gap PG between itself and the bottom surface of the recording head 42. The platen 38 includes a transportation guide portion 39 serving as a support member, a platen rib 38a formed on the top surface of the transportation guide portion 39, and an ink collecting groove 39a for collecting excess ink not used in recording. The provision of a platen rib 38a mainly aims at defining the transportation orientation of the flexible recording material P (first recording material).

Above the recording position 51 are provided the recording head 42 serving as a main component of the recording execution unit 4 and the carriage 40 that has the recording head 42 on the bottom surface thereof and can reciprocate in the width direction B so as to be guided by a carriage guide shaft 41. Furthermore, the recording execution unit 4 includes a plurality of ink tubes and ink supply pumps (not shown) for supplying ink of different colors to the recording head 42, a capping device (not shown) provided at a home position of the carriage 40, and an auto gap-adjusting mechanism (not shown) that is used when the soft recording material P and the hard recording material Q are switched.

A recording-material discharge unit 6 is provided downstream of the recording position 51 in the conveying direction A. The recording-material discharge unit 6 includes discharge rollers 43 consisting of a pair of nip rollers, namely, a discharging driving roller 44 and a discharging driven roller 45, and the discharging stacker 47. The discharging stacker 47 has an extendable stacker 48 nested therein.

A recording apparatus having the recording-medium transportation unit 5 applied to the ink jet printer 1 having the above-described structure will be described in detail with reference to the drawings.

Figure 6:
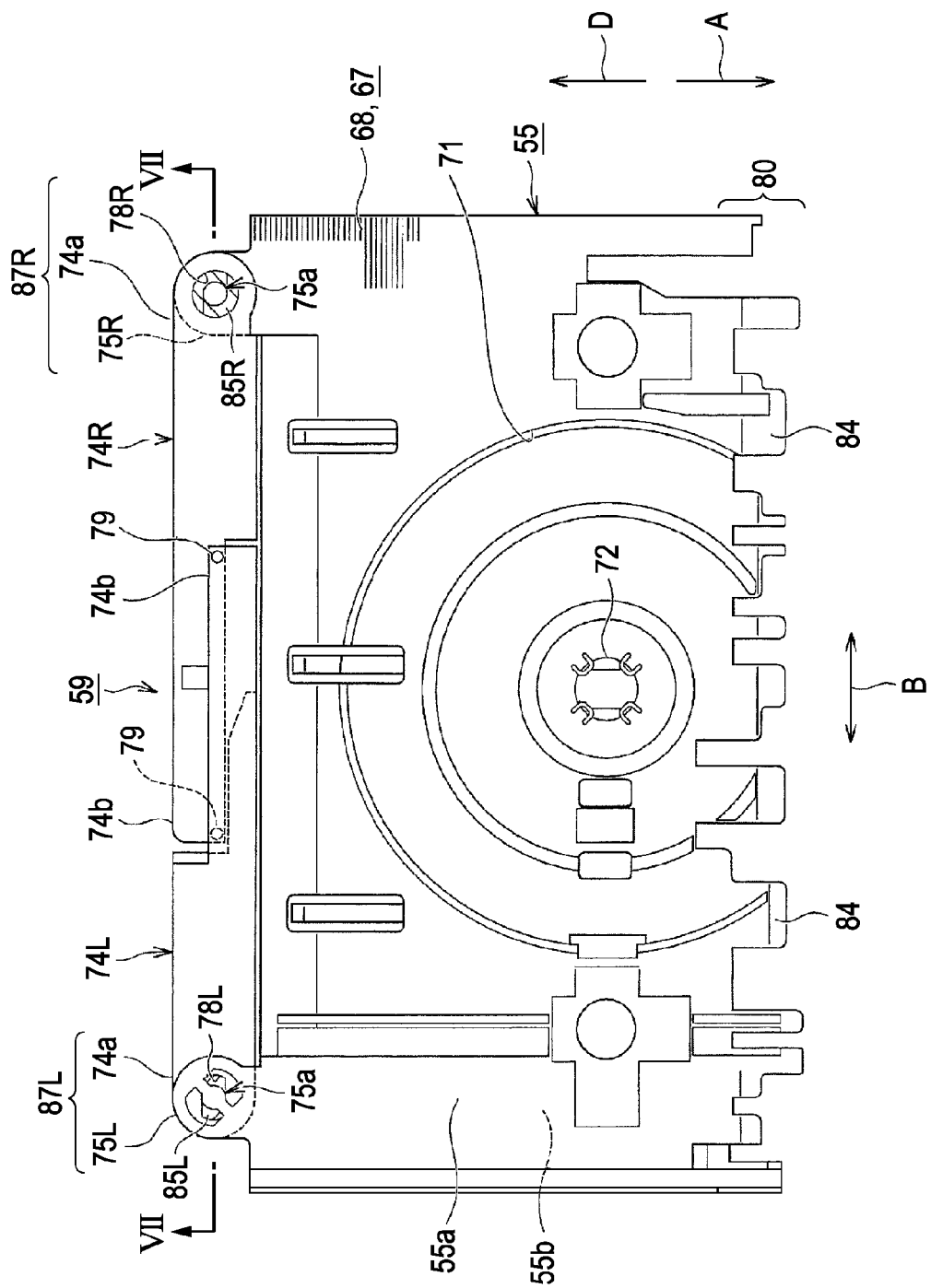
FIG. 6 is a plan view of an extendable moving mechanism when the holding tray is stored.
Figure 7:
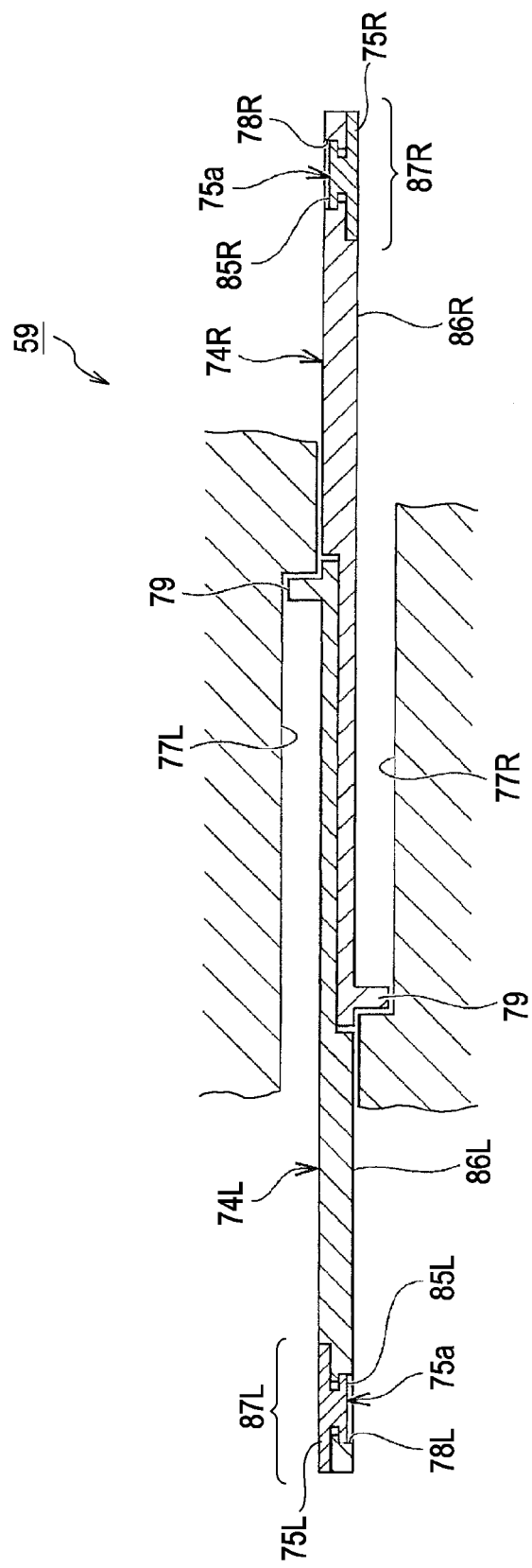
FIG. 7 is a sectional view taken along line VII-VII in FIG. 6.
Figure 8:
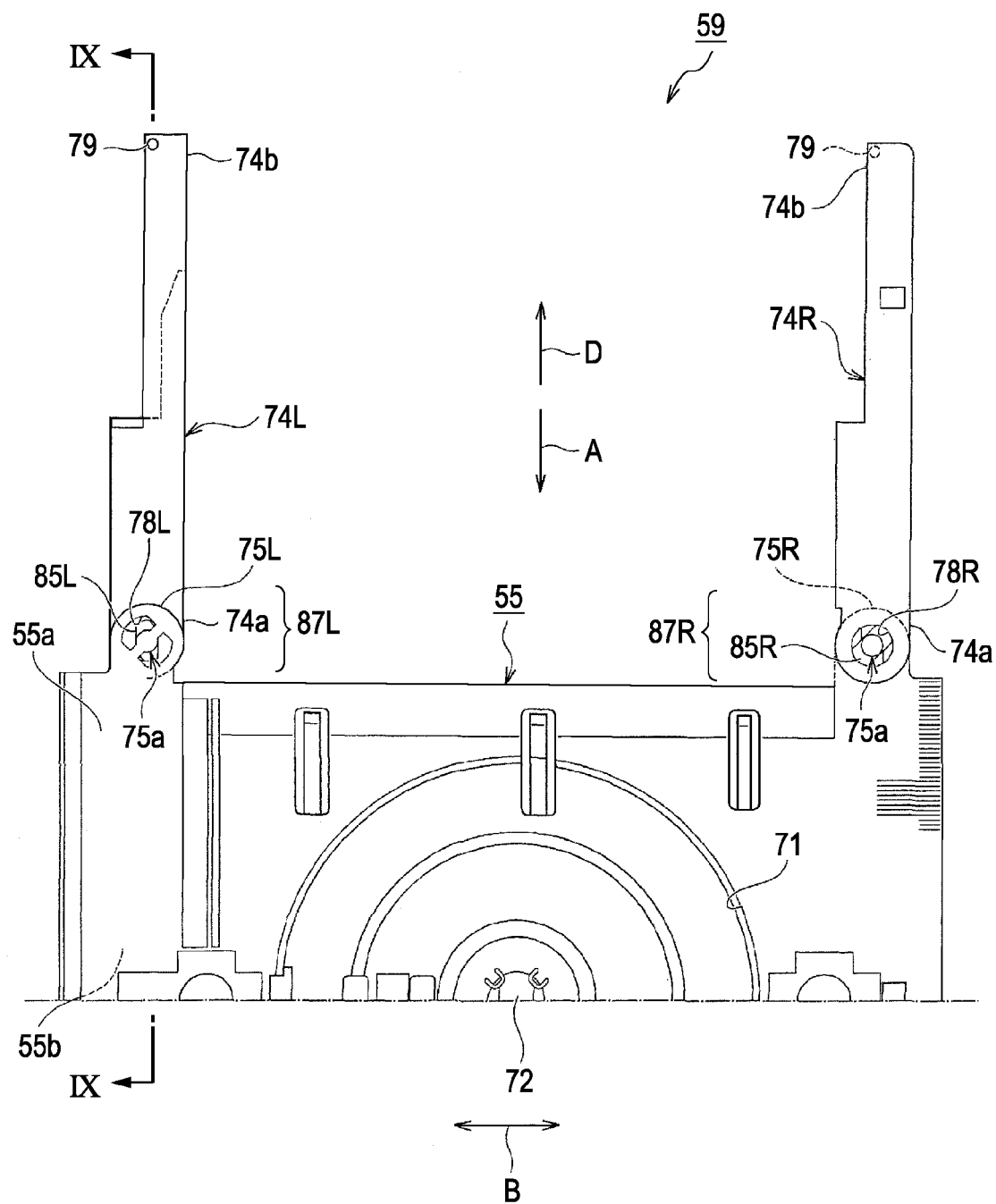
FIG. 8 is a plan view of the extendable moving mechanism when the hard recording material is set.
Figure 9:
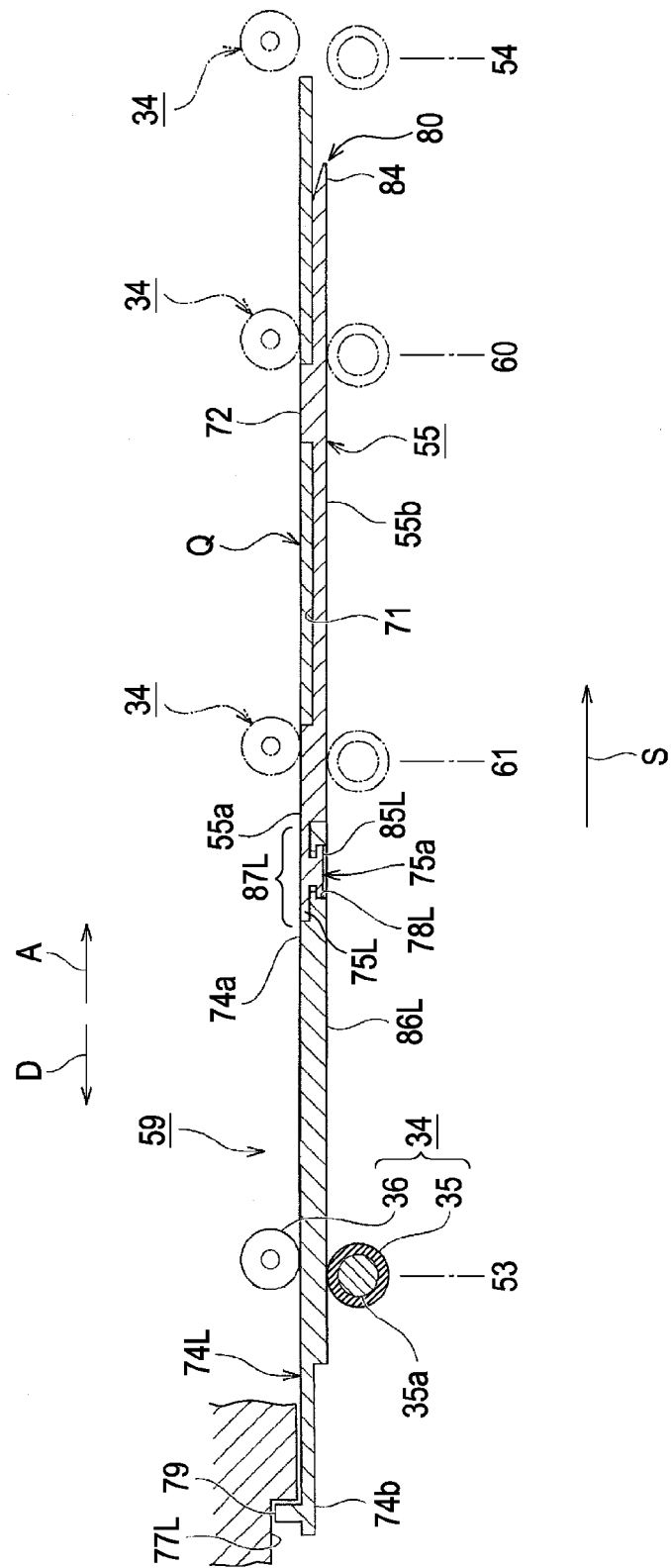
FIG. 9 is a sectional view taken along line IX-IX in FIG. 8.
Figure 10:
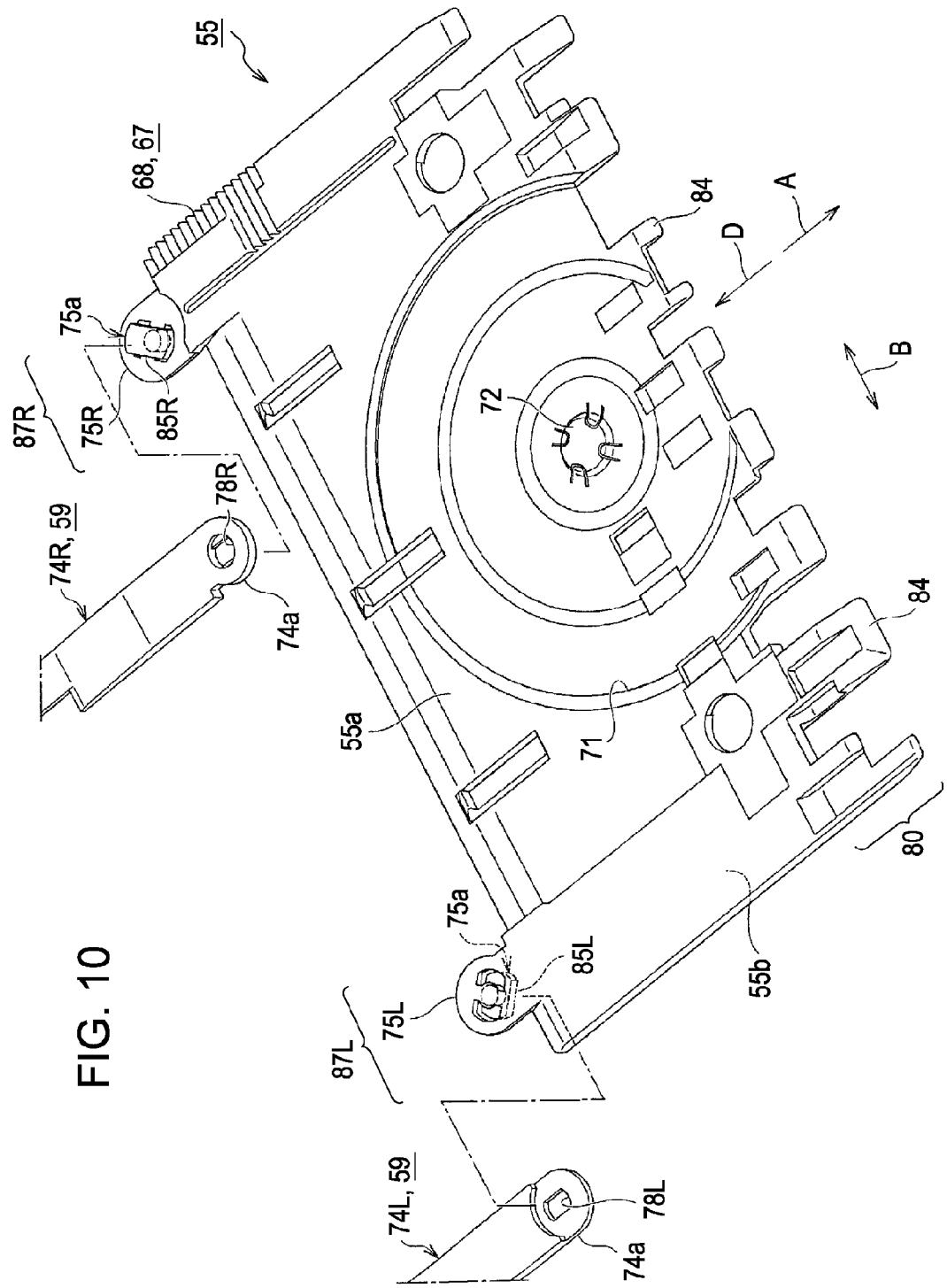
FIG. 10 is an exploded perspective view showing connection structures of the holding tray and guide arms.
Figure 11:
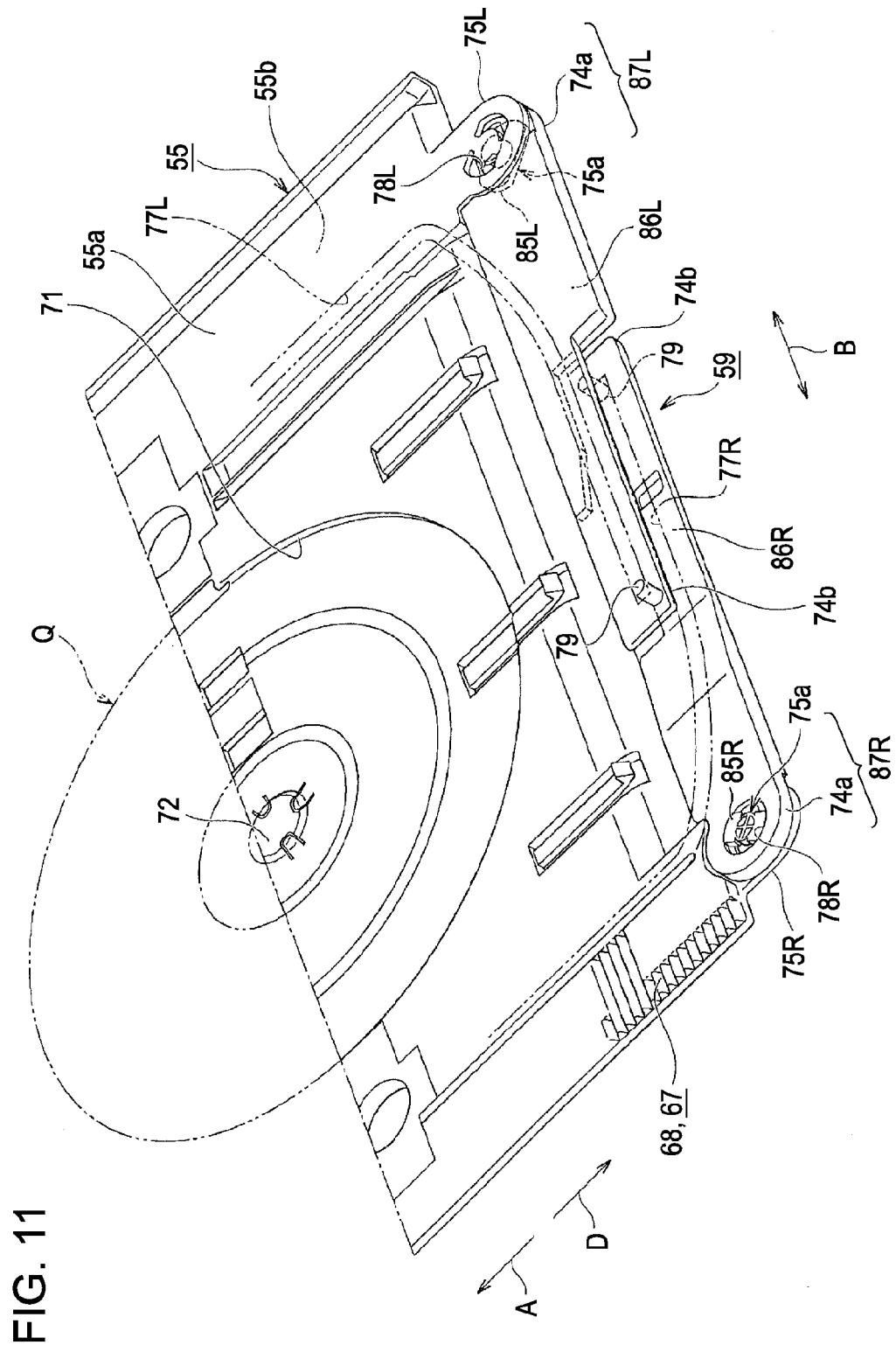
FIG. 11 is a perspective view of the extendable moving mechanism when the holding tray is stored.
Figure 12:
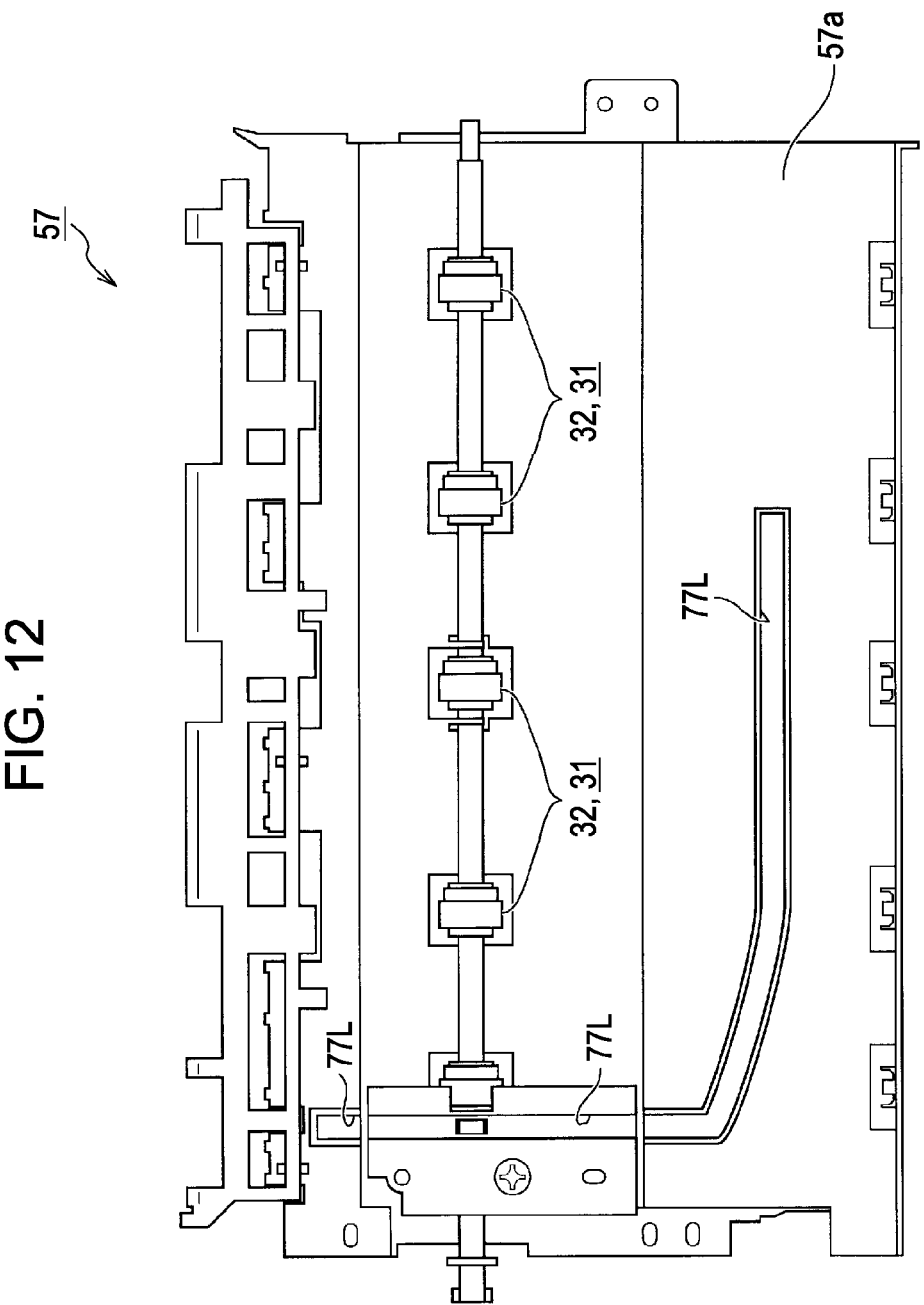
FIG. 12 is a bottom view of an upper-path forming member.

FIG. 6 is a plan view of the extendable moving mechanism when the holding tray is located at the stored position. FIG. 7 is a sectional view taken along line VII-VII in FIG. 6. FIG. 8 is a plan view of the extendable moving mechanism when the holding tray is located at the set position. FIG. 9 is a sectional view taken along line IX-IX in FIG. 8. FIG. 10 is an exploded perspective view of the holding tray and guide arms. FIG. 11 is a perspective view when the holding tray is located at the stored position, viewed from diagonally above and behind. FIG. 12 is a bottom view of the upper-path forming member.

Figure 13:
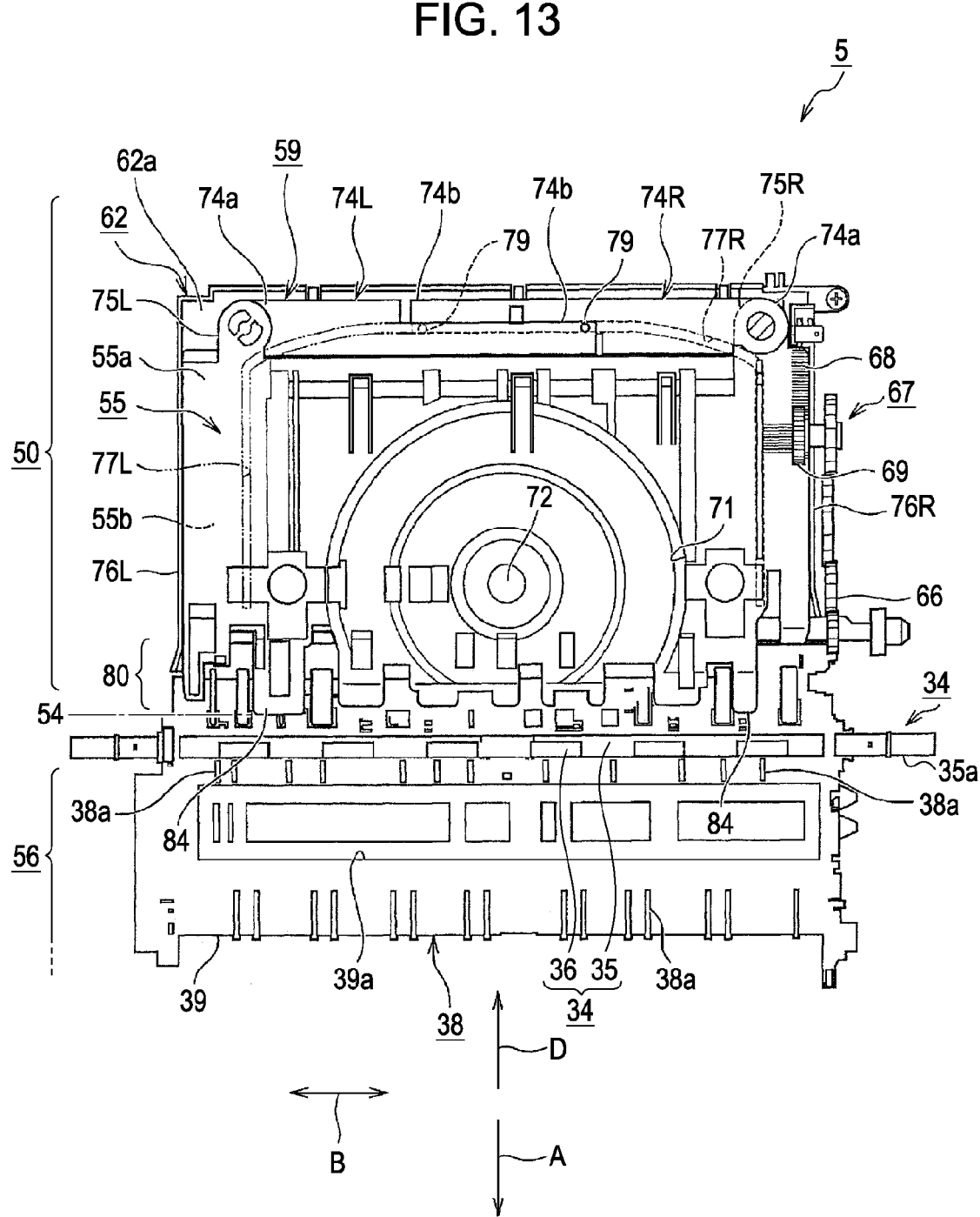
FIG. 13 is a plan view of a recording-medium transportation unit when the holding tray is stored.
Figure 14:
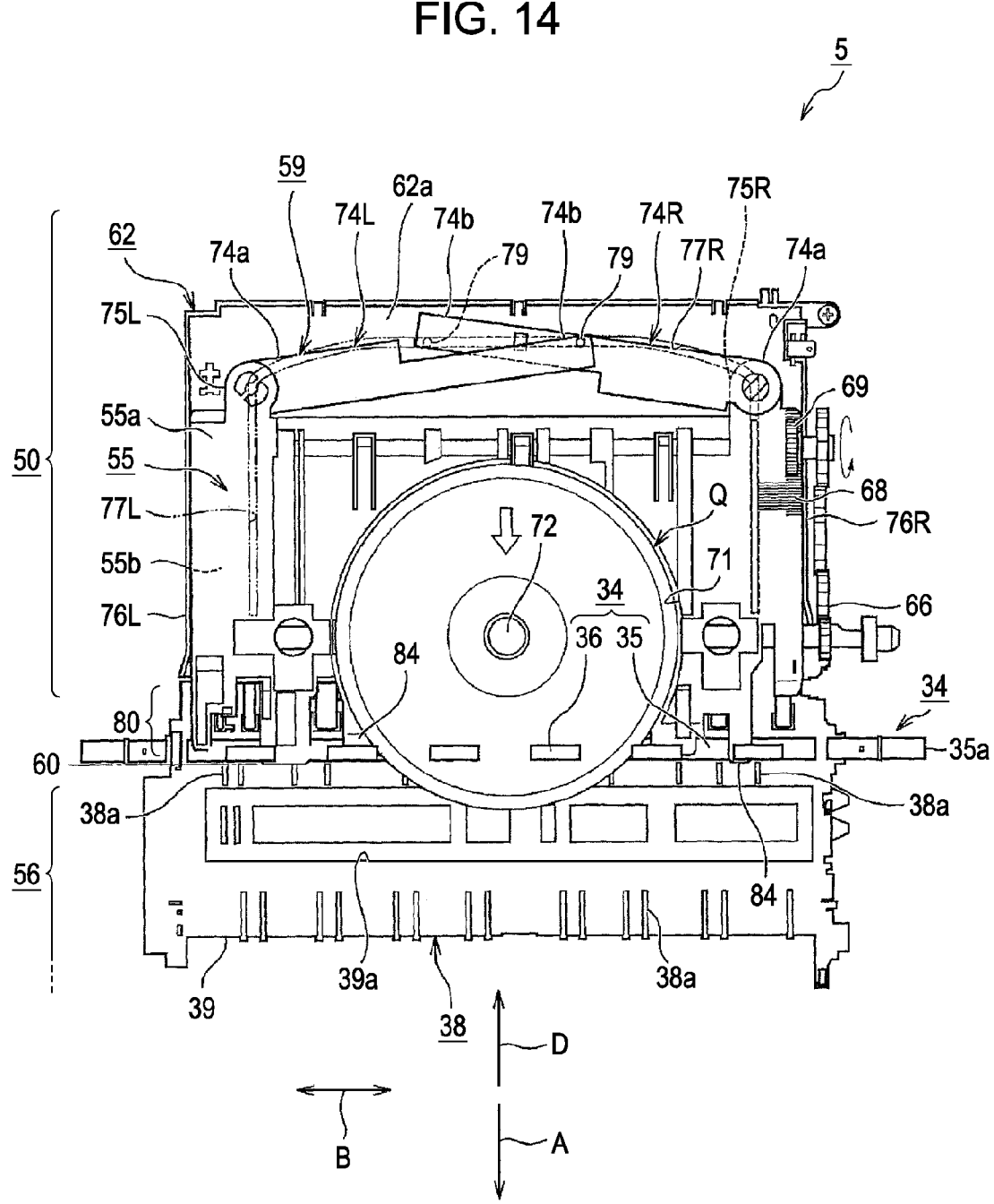
FIG. 14 is a plan view of the ink jet printer when recording is started.
Figure 15:
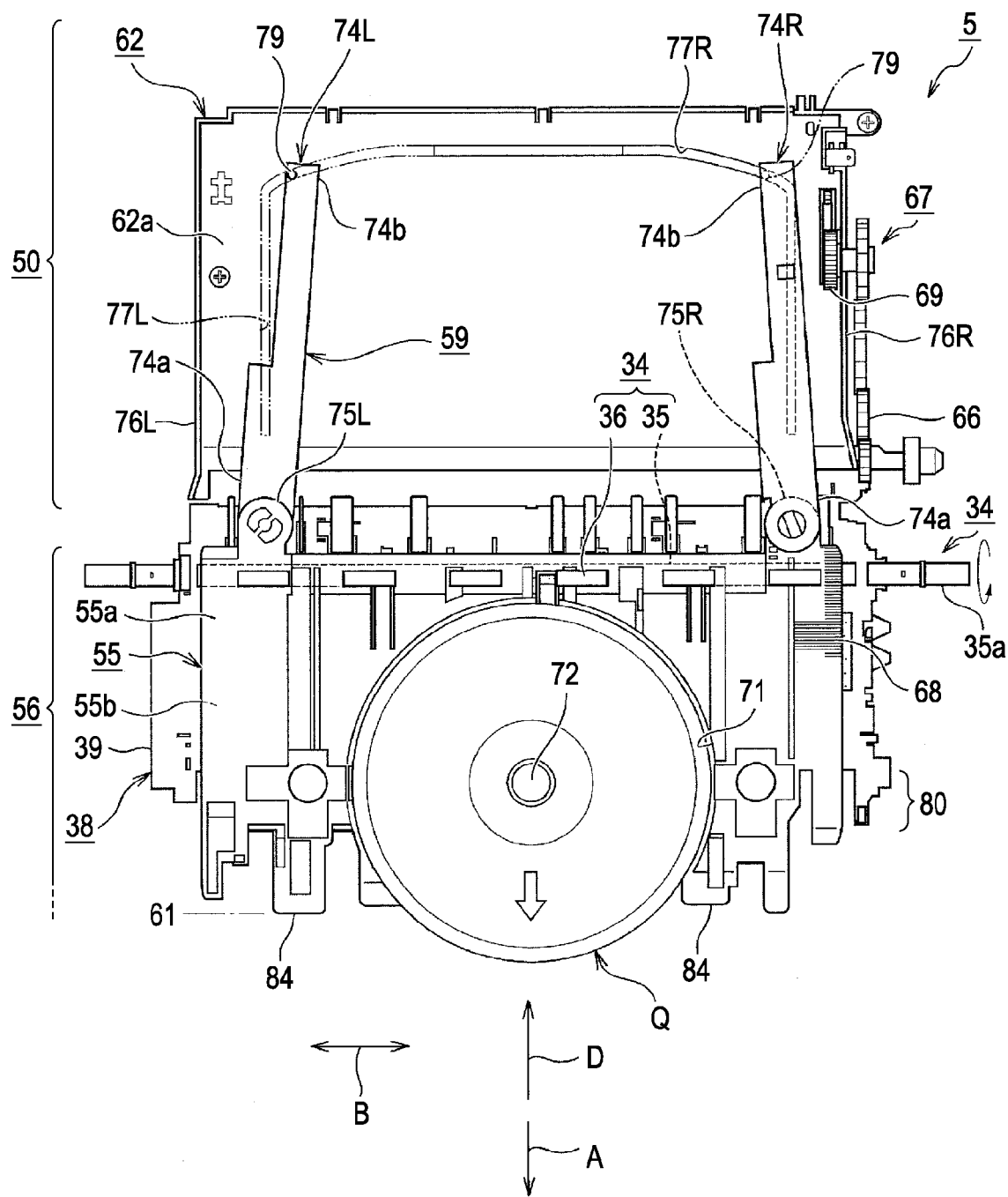
FIG. 15 is a plan view of the ink jet printer when the holding tray is located at a recording termination position.
Figure 16:
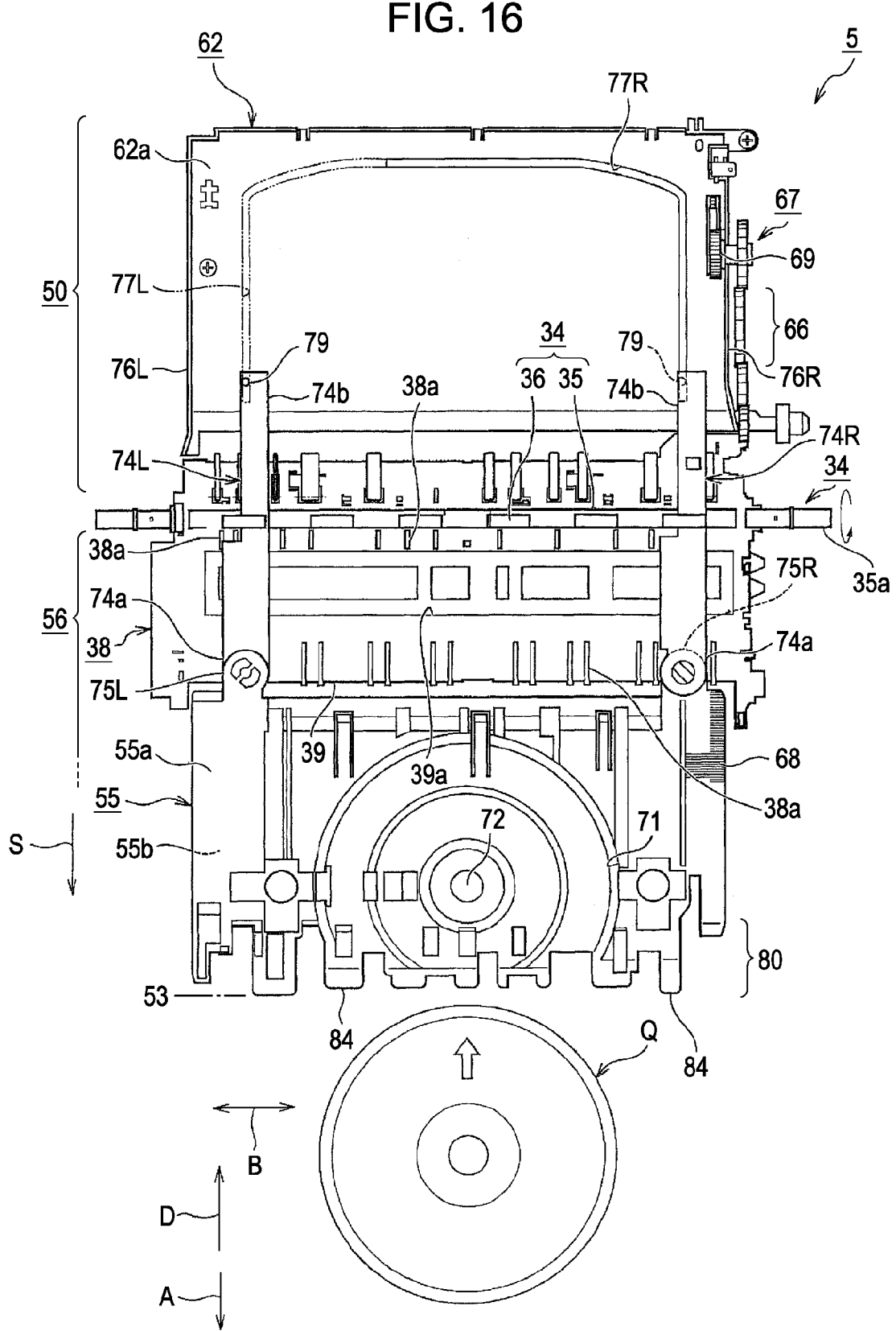
FIG. 16 is a plan view of the ink jet printer when the hard recording material is set.
Figure 17:
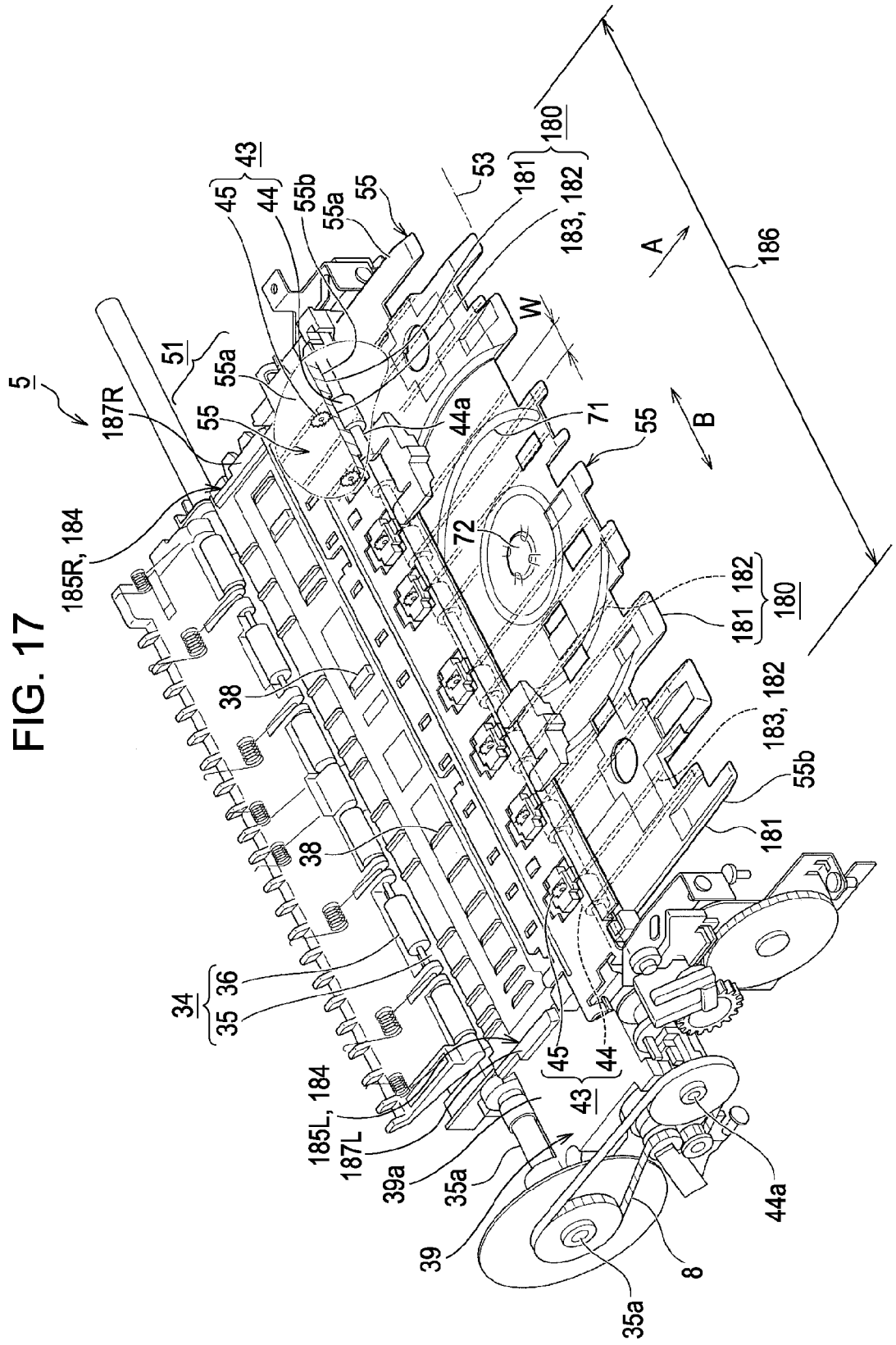
FIG. 17 is a perspective view of the recording-material transportation unit according to this embodiment when the holding tray is located at the set position.
Figure 18:
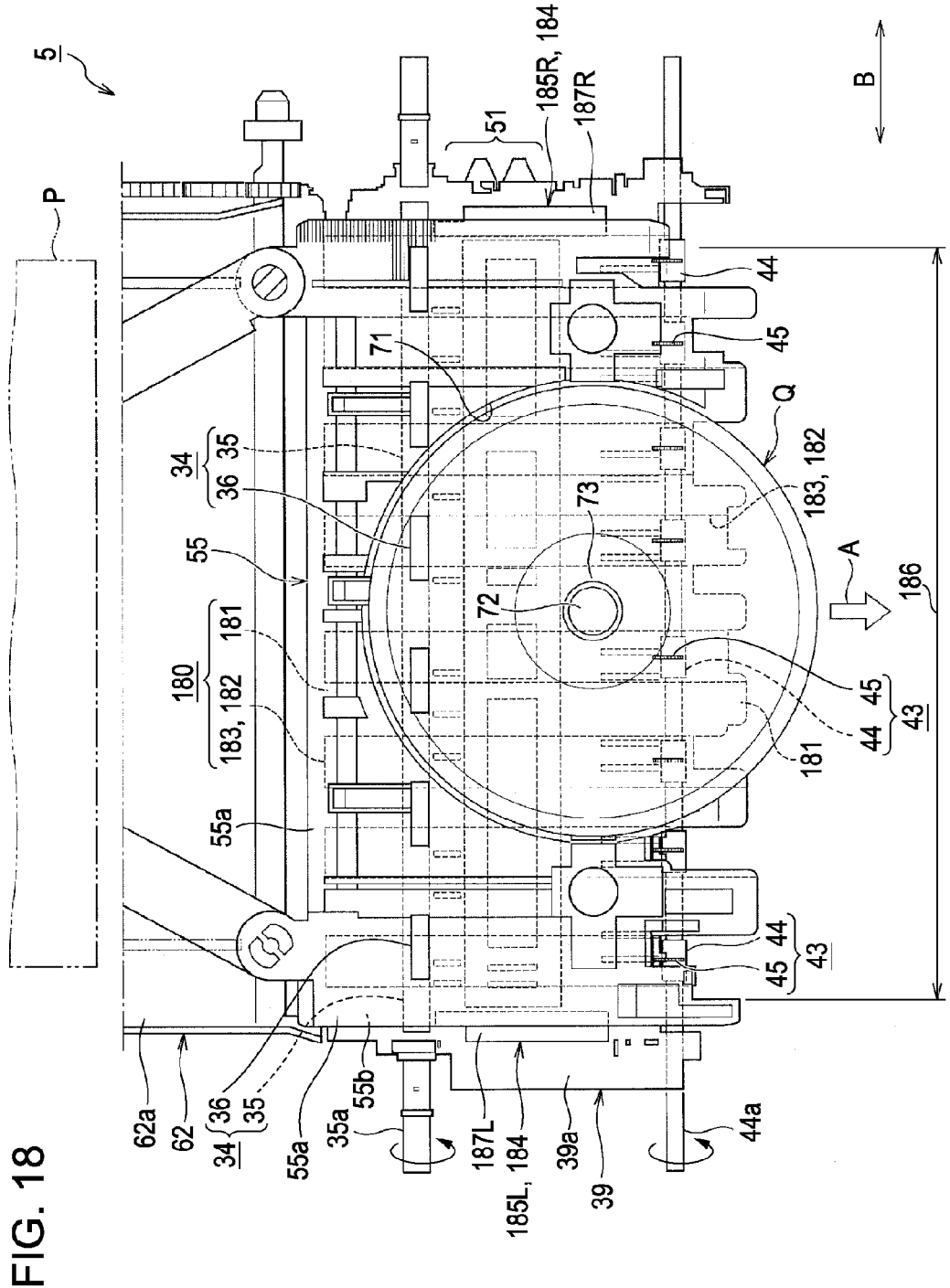
FIG. 18 is a plan view when the holding tray is located in the recording execution area.

FIG. 13 is a plan view showing the operation of the holding tray and the extendable moving mechanism when the holding tray is located at the stored position. FIG. 14 is a plan view when the holding tray is located at a recording start position. FIG. 15 is a plan view when the holding tray is located at a recording termination position. FIG. 16 is a plan view when the holding tray is located at the set position. FIG. 17 is a perspective view of a recording-material transportation unit according to this embodiment when the holding tray is located at the set position. FIG. 18 is a plan view when the holding tray is located in the recording execution area.

The recording-medium transportation unit 5 according to this embodiment basically includes: a short holding tray 55 accommodated in the printer main body 2, in which a hard recording material (second recording material) Q, such as a CD-R, is to be set; a reciprocation path 56 that guides the holding tray 55 reciprocating between a set position 53 and a stored position 54; transportation rollers (transporting mechanism) 34 that are provided in the middle of the reciprocation path 56 and consist of a transportation driving roller 35 and a transportation driven roller 36 for applying transportation force to the holding tray 55; and an extendable moving mechanism 59 that is connected to the rear end of the holding tray 55 and has an extension function with a movement stroke S that enables the movement of the holding tray 55 between the set position 53 and the stored position 54.

In addition to the above-described structures, the recording-medium transportation unit 5 according to this embodiment includes: the feeding cassette 11 that can store multiple soft recording materials P, such as normal sheets, in a stacked state; the U-shaped reversing path 50 that feeds the soft recording material P backwards from the feeding cassette 11, causes it to make a U-turn, and guides it toward the front surface 2a of the printer main body 2; and an auxiliary transportation mechanism 67 that performs auxiliary transportation until the holding tray 55 is transferred to the transportation rollers 34.

Herein, the term the "recording position 51" refers to a recording execution area in which the recording head 42 performs recording on a recording material. In FIGS. 3 and 14, reference numeral 60 denotes the position where the front end of the holding tray 55 is located when the recording on the hard recording material Q is started. This position will be referred to as a "recording start position 60" of the holding tray 55. The position where the front end of the holding tray 55 is located when the recording on the hard recording material Q is terminated is referred to as the "recording termination position" of the holding tray 55 corresponding to the recording start position 60. In FIGS. 4 and 15, reference numeral 61 denotes the position of the front end of the holding tray 55 at the recording termination position.

First, the U-shaped reversing path 50 constituting the transportation path for the soft recording material P will be described. The U-shaped reversing path 50 is provided in a rear space of the printer main body 2. The U-shaped reversing path 50 is formed of, for example, two separate upper housings 63 and 64, a transportation guide 37, and a lower housing 65, which constitute an outer guide surface 50a of the U-shaped reversing path 50; and the upper-path forming member 57, which constitutes an inner guide surface 50b of the U-shaped reversing path 50.

As shown in FIGS. 2 to 4, the U-shaped reversing path 50 includes: first intermediate feeding rollers 25 consisting of a pair of nip rollers, namely, a feeding driving roller 26 and a feeding driven roller 27; a freely rotatable second guide roller 29; and second intermediate feeding rollers 31 consisting of a pair of nip rollers, namely, a feeding driving roller 32 and a feeding driven roller 33. Because of the feeding and guiding operations of the first intermediate feeding rollers 25, the second guide roller 29, and the second intermediate feeding rollers 31, the soft recording material P fed to the U-shaped reversing path 50 passes through the U-shaped reversing path 50 and is fed to the nip point of the transportation rollers 34 provided near the downstream of the U-shaped reversing path 50.

The transportation rollers 34 consist of a pair of nip rollers, namely, the transportation driving roller 35 supported by a roller driving shaft 35a and the transportation driven roller 36 provided so as to be freely rotatable at an end of the transportation guide 37. The transportation driven roller 36 is located slightly downstream of the transportation driving roller 35 in the conveying direction A, i.e., they are arranged in what is called "downwardly guiding structure". By using the transportation rollers 34 arranged in this manner, the front end of the soft recording material P is pressed against the underlying platen rib 38a and is thereby prevented from touching the recording head 42. Thus, the recording quality is improved.

The roller driving shaft 35a receives motive power transmitted from a driving motor (not shown) to transport the soft recording material P and the tray 55 (hard recording material Q) and transmits the motive power via a gear train 66 to the auxiliary transportation mechanism 67 to perform movement starting operation to move the tray 55 from the stored position 54 and movement terminating operation to return the tray 55 to the stored position 54.

In addition, the roller driving shaft 35a has a clutch device (not shown). By appropriately changing the engaging position of the clutch device, motive power of the roller driving shaft 35a can be selectively transmitted to the above-mentioned ink supply pumps (not shown), capping device, auto gap-adjusting mechanism, and auto feeder 3.

The holding tray 55 is formed so as to be shorter than the entire moving distance over which it reciprocates. That is, the holding tray 55 is, as shown in FIG. 10, a short rectangular plate-like member having a small depth. A setting recess 71 in which the hard recording material Q is to be set is provided in the top surface 55a of the holding tray 55, at the center in the width direction and slightly frontward. A holding projection 72 for holding the hard recording material Q is provided at the center of the setting recess 71. The hard recording materials Q that can be set in the holding tray 55 include various optical discs, such as CD-Rs, CD-RWs, DVD-Rs, DVD-RWs, blu-ray discs, which draw attention as a next-generation optical disc, and other discs to be developed, with a diameter of either 12 cm or 8 cm.

As shown in FIG. 10, a front edge 80 of the holding tray 55 is formed in a comb-like zigzag shape, and projected portions thereof constitute guide nails 84 that are sloped toward the front edge. The holding tray 55, near the left and right rear corners, has tongue-like connecting pieces 75L and 75R that are connected respectively to tips 74a and 74a of left and right guide arms 74L and 74R of the extendable moving mechanism 59 (described below) so as to be rotatable. The bottom surface of the connecting piece 75L on the left side and the top surface of the connecting piece 75R on the right side are provided with mushroom-shaped connecting projections 75a each having an engaging flange portion 85 at the tip. The connecting projections 75a will be engaged with left and right connecting holes 78L and 78R (described below).

The reciprocation path 56 includes a lower-path forming member 62 that supports a bottom surface 55b of the holding tray 55 when the holding tray 55 is located at the stored position 54, left and right edge guides 76L and 76R for guiding the holding tray 55, along which the left and right edges of the holding tray 55 slide, the transportation guide portion 39 that faces the bottom surface 55b of the holding tray 55 when the holding tray 55 is located at the recording position 51, and the discharging stacker 47 that supports the bottom surface 55b of the holding tray 55 when the holding tray 55 is located at the set position 53.

The lower-path forming member 62 is a short plate-like member having substantially the same size as the holding tray 55. The left and right edge guides 76L and 76R are provided so as to extend upright from the left and right side edges of the lower-path forming member 62. As shown in FIGS. 10 and 15, the lower-path forming member 62 has a guide rail 77R engraved therein, having an L shape in plan view and serving as a guide portion, which is to be engaged with a guide pin 79 provided at the base end 74b of the right guide arm 74R of the extendable moving mechanism 59 described below.

The extendable moving mechanism 59 includes the pair of left and right guide arms 74L and 74R connected to the rear edge of the holding tray 55 so as to be rotatable, and the guide rails 77L and 77R that serve as the left and right guide portions and engage with guide pins 79 and 79 provided at base ends 74b and 74b (FIG. 9) of the guide arms 74L and 74R to guide the orientation and movement of the guide arms 74L and 74R.

The guide arms 74L and 74R are narrow, long plate-like members with rounded tips 74a and 74a. The guide arms 74L and 74R are each formed such that the tip 74a and the base end 74b are different in shape, i.e., the tip 74a is wide and thick and the base end 74b is narrow and thin. By overlaying the thin portions of the left and right guide arms 74L and 74R on top of each other, the left and right guide arms 74L and 74R can be stored in a compact, folded state without increasing the thickness or causing interference with each other. In this embodiment, the left guide arm 74L is positioned above the right guide arm 74R at the position where the left and right guide arms 74L and 74R overlie each other.

The tip 74a of the left guide arm 74L has a stepped shape in which the top surface is lowered, and has, at the center thereof, an elongated connecting hole 78 that receives the downwardly projecting connecting projection 75a of the connecting piece 75L provided at the rear edge, on the left side, of the holding tray 55. On the other hand, the tip 74a of the right guide arm 74R has a stepped shape in which the bottom surface is lowered, and has, at the center thereof, an elongated connecting hole 78R that receives the upwardly projecting connecting projection 75a of the connecting piece 75R provided at the rear edge, on the right side, of the holding tray 55. The connecting projections 75a and 75a are formed so as not to project from the corresponding connecting holes 78L and 78R when the connecting pieces 75L and 75R are connected to the tips 74a and 74a of the guide arms 74L and 74R, respectively.

Thus, the holding tray 55 and the pair of left and right guide arms 74L and 74R are formed to have a substantially uniform thickness in the area where they are in contact with the transportation rollers 34. In particular, when the holding tray 55 moves between the recording termination position and the set position 53, the guide arms 74L and 74R are held between the transportation rollers 34 so that the transportation force is applied to the holding tray 55 via the guide arms 74L and 74R. Thus, in the above-mentioned moving area, contact surfaces 86L and 86R of the guide arms 74L and 74R on the transportation rollers 34 side are flat surfaces.

There is a slight step due to fabrication error or assembly error at each of the connection portion 87L on the left side (in FIG. 10) of the holding tray 55, at which the connecting piece 75L and the guide arm 74L are connected, and the connection portion 87R on the right side of the holding tray 55, at which the connecting piece 75R and the guide arm 74R are connected. However, because the positional relationship in the top-bottom direction between the holding tray 55 and the guide arm 74L of the left connection portion 87L is opposite to that between the holding tray 55 and the guide arm 74R of the right connection portion 87R, these steps at the left and right connection portions 87L and 87R are located at different positions in the conveying direction. Accordingly, when the connection portions 87L and 87R pass through the nip between the transportation rollers 34, the steps at the left and right connection portions 87L and 87R successively pass through the nip between the transportation rollers 34. Thus, the holding tray 55 is smoothly transported regardless of whether it is transported in the conveying direction A or returning direction D.

The guide rails 77L and 77R are grooves arranged symmetrically and each having an L shape in plan view. The left guide rail 77L is provided in an inner surface 57a of the upper-path forming member 57, and the right guide rail 77R is provided in a top surface 62a of the lower-path forming member 62. The guide pin 79 of the left guide arm 74L is engaged with the left guide rail 77L so as to be movable, and the guide pin 79 of the right guide arm 74R is engaged with the right guide rail 77R so as to be movable. Thus, the upper-path forming member 57 serves as a component of the U-shaped reversing path 50, as described above, as well as a component of the reciprocation path 56.

The movement of the holding tray 55 in the conveying direction A and the returning direction D opposite the conveying direction A is performed not only by the transportation rollers 34 but also by the auxiliary transportation mechanism 67. The auxiliary transportation mechanism 67 moves the holding tray 55 located at the stored position 54 to the recording start position 60 and returns the holding tray 55 located at the recording start position 60 to the stored position 54. Examples of the auxiliary transportation mechanism 67 include a rack and pinion mechanism. In this embodiment, as shown in FIG. 13, the auxiliary transportation mechanism 67 includes a rack 68 provided on the top surface 55a of the holding tray 55, near the right rear corner, and a pinion 69 engaged with the rack 68, provided at the end of the gear train 66 for transmitting motive power of the roller driving shaft 35a.

The operation of the thus-configured recording apparatus will be described with respect to the following situations:
(1) When the holding tray is stored (accommodated);
(2) When recording is started;
(3) When recording is terminated; and
(4) When the holding tray is set.
(1) When the Holding Tray is Stored (Accommodated) (Refer to FIGS. 2, 6, 7, 11, and 13)

When the holding tray 55 is located at the stored position 54, as shown in the drawings, the left and right guide arms 74L and 74R overlie one another in a compact form and are stored in the rear space of the lower-path forming member 62. In this state, as shown in FIG. 2, recording can be performed on the soft recording material P. That is, the uppermost one of the soft recording materials P accommodated in the feeding cassette 11 is fed to the U-shaped reversing path 50 by the auto feeder 3.

In the U-shaped reversing path 50, the first intermediate feeding rollers 25 and the second intermediate feeding rollers 31 apply feeding force to the soft recording material P. The soft recording material P is guided to the transportation rollers 34 by the second guide roller 29, the outer guide surface 50a and the inner guide surface 50b of the U-shaped reversing path 50, and the inner guide surface 37a of the transportation guide 37. The transportation rollers 34 hold and transport the soft recording material P to the recording position 51, where the recording execution unit 4 performs recording.
(2) When Recording is Started (Refer to FIGS. 3, 9, and 14)

The holding tray 55 located at the stored position 54 is first moved to the set position 53 shown in FIGS. 5 and 16 by the auxiliary transportation mechanism 67 and the transportation rollers 34. That is, when the motive power of the roller driving shaft 35a is transmitted to the rack 68 on the top surface 55a of the holding tray 55 via the gear train 66 and the pinion 69, the holding tray 55 starts to move forward. Once the front edge 80 of the holding tray 55 arrives at the nip point of the transportation rollers 34, the auxiliary transportation mechanism 67 stops transmitting the motive power. Then, the transportation rollers 34 starts transmitting the motive power to bring the holding tray 55 to the set position 53.

When the hard recording material Q is set in the setting recess 71 in the holding tray 55, the transportation rollers 34 bring the holding tray 55 back to the recording start position 60 shown in FIGS. 3 and 14. Then, the holding tray 55 is transported in the conveying direction A by the transportation force of the transportation rollers 34. At the same time, the carriage 40 reciprocating in the width direction B causes ink of different colors to be ejected from the recording head 42 over the entire width of the recording surface of the hard recording material Q from above. Thus, recording is started. The holding tray 55 is used when the recording is performed on the recording surface of the hard recording material Q. Therefore, before the recording is started, the gap PG between the recording head 42 and the platen 38 is increased upward by the auto gap adjusting device (not shown) to set the gap to the gap PG for the hard recording material Q.
(3) When Recording is Terminated (Refer to FIGS. 4, 9, and 15)

When the holding tray 55 is transported to the recording termination position, the recording on the recording surface of the hard recording material Q is terminated. At this time, the front end of the holding tray 55 shown in FIGS. 4 and 15 are located at the recording termination position 61.

When the holding tray 55 is moved from the recording start position 60 to the recording termination position 61, the transportation rollers 34 directly hold the holding tray 55 therebetween to apply the transportation force to the holding tray 55. The accurate, stable, and smooth transportation of the holding tray 55 improves the recording quality.
(4) When the Holding Tray is Set (Refer to FIGS. 5, 8, 9, and 16)

When the hard recording material Q is to be set in the holding tray 55 or when the hard recording material Q after recording is to be removed from the holding tray 55, the holding tray 55 is located at the set position 53 where it is fully drawn frontward by the amount of movement stroke S, as shown in FIGS. 5, 8, 9, and 16. The holding tray 55 is moved from the recording termination position 61 to the set position 53 by allowing the left and right guide arms 74L and 74R to extend in the conveying direction A and by holding the guide arms 74L and 74R between the transportation rollers 34 to apply the transportation force indirectly to the holding tray 55.

As described above, in the area in which the holding tray 55 is moved between the recording termination position 61 and the set position 53, the contact surfaces 86L and 86R of the guide arms 74L and 74R on the transportation driving roller 35 side are flat. In addition, as described above, the positional relationship in the top-bottom direction between the holding tray 55 and the guide arm 74L of the left connection portion 87L is opposite to that between the holding tray 55 and the guide arm 74R of the right connection portion 87R. Accordingly, the holding tray 55 is smoothly transported while maintaining a stable orientation in the above-mentioned area as in the case where it is held between the transportation rollers 34 and receives transportation force directly.

The movement of the holding tray 55 between the stored position 54 and the set position 53, between the recording start position 60 and the recording termination position 61, and between the recording termination position 61 and the set position 53 causes the guide pins 79 and 79 provided at the base ends 74b and 74b of the left and right guide arms 74L and 74R to move while being engaged with the guide rails 77L and 77R, respectively. Thus, the orientation of the guide arms 74L and 74R is continuously changed from the orientation in which they are folded so as to overlie each other, as shown in FIGS. 2, 6, 7, 11, and 13, to the orientation in which they are extended, as shown in FIGS. 5, 8, 9, and 16.

The operation of the recording-medium transportation unit 5 when the holding tray 55 returns from the set position 53 to the stored position 54 is the same as that when the holding tray 55 moves from the stored position 54 to the set position 53 except that the operation proceeds in reverse order.

Embodiment

In a recording apparatus according to an embodiment of the invention, a hard recording material Q, such as a CD-R, is set in the setting recess 71 in the holding tray 55, and the transportation rollers 34 move the holding tray 55 to the recording execution area 51, where recording is performed on the hard recording material Q. The front edge 80 of the setting recess 71 (the front edge of the holding tray) is set back from the outer edge of the hard recording material Q set in the holding tray 55.

The holding tray 55 has a length sufficient to be transported from the recording start position 60 (FIGS. 3 and 14) to the recording termination position 61 (FIGS. 4 and 15) with respect to the hard recording material Q by receiving the transportation force from the transportation rollers 34.

As described above, the transportation rollers 34 consist of the transportation driving roller 35 that comes into contact with the bottom surface 55b of the setting recess 71 in the holding tray 55 to apply transportation force and the transportation driven roller 36 that comes into contact with the top surface 55a of the holding tray 55. The orientation of the holding tray 55 during transportation from the recording start position 60 to the recording termination position 61 is maintained by the transportation driving roller 35 and supporting step portions 185L and 185R (FIGS. 17 and 18), serving as an orientation-maintaining portion 184.

That is, the recording-material transportation unit 5 according to this embodiment includes the holding tray 55, the transportation rollers 34, and the discharging rollers 43. This embodiment is characterized in that the holding tray 55 is transported in the recording execution area 51 only by the transportation force from the transportation rollers 34, not by the feeding force from discharge driving rollers 44, and the parallelism between the holding tray 55 and the recording head 42, i.e., the horizontal orientation of the holding tray 55 with respect to the recording head 42, in the recording execution area 51 is maintained by the orientation-maintaining portion 184 and the transportation driving roller 35, not by the discharge driving rollers 44.

In this embodiment, the orientation-maintaining portion 184 includes the supporting step portions 185L and 185R formed on the top surface 39a of the transportation guide portion 39 provided downstream of the transportation rollers 34. The supporting step portions 185L and 185R are provided on the left and right side of an area 186 through which the soft recording material (first recording material) P, such as a sheet, passes. The height of top surfaces 187L and 187R of the supporting step portions 185L and 185R is set to the same level as a top T0 of the outer circumference of the transportation driving roller 35.

The bottom surface 55b of the holding tray 55 has projection-recess structures 180 each having a projection 181 that comes into contact with the outer circumference of the transportation driving roller 35 and a recess 182 that receives the discharge driving roller 44. The recesses 182 are provided corresponding to the number of the discharge driving rollers 44 and are formed of grooves 183 extending in parallel in the conveying direction A of the second recording material Q.

The width W of the grooves 183 is set larger than the length of the discharge driving rollers 44 so that the grooves 183 can receive the discharge driving rollers 44, and the depth H of the grooves 183 is set such that gaps are left between bottom surfaces 83a of the grooves 183 and the outer circumferences of the discharge driving rollers 44 when the second recording material Q is horizontally transported using the holding tray 55.

In this embodiment, the front edge 80 of the setting recess 71 is set back from the outer edge of the hard recording material Q set in the holding tray 55, i.e., the front edge is cut shorter than the hard recording material Q. This can shorten the holding tray 55 in the feeding direction by a length equivalent to the setback portion and reduce the size of the component.

The holding tray 55 has a length sufficient to be transported from the recording start position 60 to the recording termination position 61 by directly receiving the transportation force from the transportation rollers 34 without switching to another feeding mechanism. That is, when recording is performed on the hard recording material Q, the hard recording material Q has to be transported in the conveying direction over a distance equivalent to the length thereof. In this embodiment, because the length of the holding tray 55 is equivalent to the entire length of the hard recording material Q, which is the minimum necessary length, the size of the holding tray 55 can be assuredly reduced compared to a known holding tray. Furthermore, because the transportation by the transportation rollers 34 is not switched to another mechanism from start to termination of recording, transportation accuracy can be maintained while a reduction in size is achieved.

In addition, the orientation of the holding tray 55 during transportation from the recording start position 60 to the recording termination position 61 is maintained by the transportation driving roller 35 and the supporting step portions 185L and 185R serving as the orientation-maintaining portion 184. In the case where the front edge 80 of the setting recess 71 in the holding tray 55 is set back from the outer edge of the hard recording material Q and recording is performed on the hard recording material Q from the front end in the recording execution area, it is structurally impossible to perform recording while the front end of the holding tray 55 is supported by the discharge driving rollers 44 to maintain the orientation. Thus, the orientation of the holding tray 55 with respect to the recording head 42 may become inappropriate.

However, in this embodiment, because the orientation of the holding tray 55 during transportation from the recording start position 60 to the recording termination position 61 is maintained by the transportation driving roller 35 and the supporting step portions 185L and 185R serving as the orientation-maintaining portion 184, even though the discharge driving rollers 44 cannot be used for structural reasons, recording can be performed while the orientation of the holding tray 55 is appropriately maintained.

In addition, the transportation driving roller 35 and the transportation driven roller 44 are typically arranged in what is called "downwardly guiding structure" so as to urge the soft recording material P, such as a sheet, against the platen 38 to maintain a certain distance between the sheet and the recording head 42 and to prevent the leading end or trailing end of the sheet from floating up when recording is performed on the sheet. In this "downwardly guiding structure", the holding tray 55 tends to be displaced from the original orientation particularly when the discharge driving rollers 44 cannot be used. However, it can be said that the structure having the supporting step portions 185L and 185R serving as the orientation-maintaining portion 184 according to this embodiment is particularly advantageous when used with the "downwardly guiding structure".

What is claimed is:

1. A recording apparatus comprising:
   a holding tray in which a second recording material can be set; and
   a transportation driving roller that transports a first recording material and the holding tray,
   wherein a frontmost edge of the holding tray is cut inside of an outer edge of the second recording material set in the holding tray, wherein the frontmost edge of the holding tray is located opposite an edge of the holding tray that first enters the recording apparatus when the holding tray enters the recording apparatus, wherein the second recording material is set in a state of protruding from the holding tray in a direction that is opposite of a direction of entering the recording apparatus, and wherein the frontmost edge of the holding tray includes guide nails that are sloped toward an outer side of the recording apparatus.

2. The recording apparatus according to claim 1, wherein the holding tray has a length sufficient to be transported from a recording start position where recording on the second recording material is started to a recording termination position where recording on the second recording material is terminated by receiving transportation force from the transportation driving roller.

3. The recording apparatus according to claim 2, further comprising an orientation-maintaining portion that supports the holding tray in cooperation with the transportation driving roller to define an orientation of the holding tray during transportation from the recording start position to the recording termination position, wherein the orientation-maintaining portion supports the holding tray at a position outside an area through which the first recording material passes.

4. The recording apparatus according to claim 3, further comprising a transportation driven roller that holds the holding tray between the transportation driven roller and the transportation driving roller, wherein the transportation driving roller and the transportation driven roller are arranged so as to apply urging force that urges a portion of the second recording material positioned downstream of the transportation driving roller toward the orientation-maintaining portion.

5. The recording apparatus according to claim 1, wherein the holding tray is shorter than an entire traveling distance thereof and has an extendable moving mechanism that enables the holding tray to move over the entire traveling distance thereof.

6. The recording apparatus according to claim 1, wherein the holding tray is configured to be housed in the recording apparatus behind one or more transportation rollers of the recording apparatus as viewed from a recording head of the recording apparatus.

7. A holding tray in which a hard recording material can be set and that is configured for use with a recording apparatus, the holding tray comprising:

a frontmost edge that located opposite an edge of the holding tray that first enters the recording apparatus when the holding tray enters the recording apparatus, wherein the frontmost edge of the holding tray is cut inside of an outer edge of the hard recording material set in the holding tray, wherein the hard recording material is set in a state of protruding from the holding tray in a direction that is opposite of a direction of entering the recording apparatus, and wherein the frontmost edge of the holding tray includes guide nails that are sloped toward an outer side of the recording apparatus.

8. The holding tray according to claim 7, wherein the holding tray is configured to be housed in the recording apparatus behind one or more transportation rollers of the recording apparatus as viewed from a recording head of the recording apparatus.

9. A recording apparatus comprising:

a holding tray in which a second recording material can be set; and a transportation driving roller that transports a first recording material and the holding tray, wherein a frontmost edge of the holding tray is located opposite an edge of the holding tray that first enters the recording apparatus when the holding tray enters the recording apparatus, and wherein the second recoding material is set in a state of protruding from the holding tray in a direction that is opposite of a direction of entering the recording apparatus, wherein the frontmost edge of holding tray includes a plurality of comb-like zigzag shaped projection recess structures having a projection that comes into contact with an outer circumference of the transportation driving roller when the transportation roller transports the holding tray, wherein a portion of the second recording material extends past the comb-like zigzag shaped projection recess structures when the second recording material is placed in the holding tray, and wherein the edge of the holding tray that first enters the recording apparatus includes an extendable moving mechanism including a first foldable arm and second foldable arm that engage with guide rails of the recording apparatus when the holding tray enters the recording apparatus.

* * * * *